United States Patent
Benari et al.

(10) Patent No.: US 10,127,084 B2
(45) Date of Patent: Nov. 13, 2018

(54) PRE-PROVISIONING RESOURCES FOR COMPOSITE APPLICATIONS

(71) Applicant: Red Hat Israel, Ltd., Raanana (IL)

(72) Inventors: Amos Benari, Raanana (IL); Ohad Levy, Raanana (IL)

(73) Assignee: Red Hat Israel, Ltd., Raanana (IL)

( * ) Notice: Subject to any disclaimer, the term of this patent is extended or adjusted under 35 U.S.C. 154(b) by 381 days.

(21) Appl. No.: 13/678,401

(22) Filed: Nov. 15, 2012

(65) Prior Publication Data

US 2014/0136711 A1 May 15, 2014

(51) Int. Cl.
*G06F 15/173* (2006.01)
*G06F 9/50* (2006.01)
*G06F 8/61* (2018.01)
*G06F 8/10* (2018.01)
*G06F 9/455* (2018.01)

(52) U.S. Cl.
CPC .............. *G06F 9/5061* (2013.01); *G06F 8/61* (2013.01); *G06F 8/10* (2013.01); *G06F 9/45558* (2013.01); *G06F 9/5077* (2013.01); *G06F 2009/45562* (2013.01); *G06F 2209/5011* (2013.01)

(58) Field of Classification Search
CPC .......... G06F 2209/5011; G06F 9/5061; G06F 9/5027; G06F 9/4406; G06F 3/0605; G06F 9/5072; G06F 2009/45575; G06F 8/61; G06F 9/45558; G06F 8/36; G06Q 30/02
USPC .......................... 717/120; 709/226; 718/104
See application file for complete search history.

(56) References Cited

U.S. PATENT DOCUMENTS

| | | | | |
|---|---|---|---|---|
| 7,421,716 | B1* | 9/2008 | Margulis et al. | 719/331 |
| 7,774,791 | B1* | 8/2010 | Appelbaum et al. | 719/318 |
| 8,151,245 | B2* | 4/2012 | Oberlin | G06F 9/5055 709/201 |
| 8,346,921 | B1* | 1/2013 | Goodspeed | G06Q 30/02 709/200 |
| 8,370,481 | B2* | 2/2013 | Wilson | G06F 9/5061 709/223 |
| 8,370,802 | B2* | 2/2013 | Pacifici et al. | 717/120 |

(Continued)

OTHER PUBLICATIONS

Iqbal, Waheed, et al. "Adaptive resource provisioning for read intensive multi-tier applications in the cloud." 2011. Future Generation Computer Systems 27.6: pp. 871-879.*

(Continued)

*Primary Examiner* — Lewis A Bullock, Jr.
*Assistant Examiner* — Gilles Kepnang
(74) *Attorney, Agent, or Firm* — Lowenstein Sandler LLP

(57) ABSTRACT

A processing device performs a statistical analysis of a plurality of previously provisioned composite applications, a composite application of the plurality of previously provisioned composite applications comprising a plurality of nodes, the plurality of nodes each having a final provisioned state for an application component of the composite application. The processing device predicts an intermediate provisioned state to be used for a node of a future composite application based on the statistical analysis. Prior to receiving a request to provision a new composite application comprising a node having a final provisioned state that is compatible with the determined intermediate provisioned state, the processing device provisions software on a resource to cause the resource to have the intermediate provisioned state.

17 Claims, 9 Drawing Sheets

(56) References Cited

U.S. PATENT DOCUMENTS

| | | | |
|---|---|---|---|
| 8,533,724 B1* | 9/2013 | Theimer | G06F 9/45558 718/1 |
| 8,589,557 B1* | 11/2013 | Labat et al. | 709/226 |
| 9,003,416 B2* | 4/2015 | Gangemi et al. | 718/104 |
| 2002/0087963 A1* | 7/2002 | Eylon | H04L 29/06 717/174 |
| 2003/0149685 A1* | 8/2003 | Trossman | G06F 9/5011 |
| 2005/0071107 A1* | 3/2005 | Betzler | G06F 9/5061 702/108 |
| 2007/0106798 A1* | 5/2007 | Masumitsu | G06F 9/5027 709/226 |
| 2007/0143767 A1* | 6/2007 | Attanasio | G06F 9/5061 718/104 |
| 2007/0168919 A1* | 7/2007 | Henseler et al. | 717/101 |
| 2007/0233681 A1* | 10/2007 | Ronen et al. | 707/8 |
| 2007/0250629 A1* | 10/2007 | Blanding et al. | 709/226 |
| 2007/0250630 A1* | 10/2007 | Blanding et al. | 709/226 |
| 2008/0209016 A1* | 8/2008 | Karve | G06F 8/61 709/221 |
| 2009/0182782 A1* | 7/2009 | Karve | G06F 11/1433 |
| 2009/0249296 A1* | 10/2009 | Haenel et al. | 717/120 |
| 2010/0058342 A1* | 3/2010 | Machida | G06F 9/5077 718/1 |
| 2010/0082528 A1* | 4/2010 | Tagami | G06F 17/30312 707/609 |
| 2010/0162276 A1* | 6/2010 | Sim et al. | 719/328 |
| 2010/0281166 A1* | 11/2010 | Buyya | G06F 9/5072 709/226 |
| 2010/0281473 A1* | 11/2010 | Zhang et al. | 717/171 |
| 2010/0306772 A1* | 12/2010 | Arnold et al. | 718/1 |
| 2011/0041066 A1* | 2/2011 | Kimmet | G06F 8/61 715/736 |
| 2011/0296254 A1* | 12/2011 | Kemper | G06F 8/36 714/49 |
| 2011/0321031 A1* | 12/2011 | Dournov | G06F 9/45533 717/171 |
| 2012/0131577 A1* | 5/2012 | Arcese | G06F 8/60 718/1 |
| 2012/0151198 A1* | 6/2012 | Gupta et al. | 713/2 |
| 2012/0265881 A1* | 10/2012 | Chen et al. | 709/226 |
| 2013/0014107 A1* | 1/2013 | Kirchhofer | G06F 9/5083 718/1 |
| 2013/0024856 A1* | 1/2013 | Yusupov | G06F 9/4406 718/1 |
| 2013/0055239 A1* | 2/2013 | Anderson | G06F 9/455 718/1 |
| 2013/0055258 A1* | 2/2013 | De | G06F 8/63 718/1 |
| 2013/0111034 A1* | 5/2013 | Upadhya | G06F 3/0605 709/226 |
| 2013/0138806 A1* | 5/2013 | Gohad | H04L 43/08 709/224 |
| 2013/0139152 A1* | 5/2013 | Chang | G06F 9/45545 718/1 |
| 2013/0174149 A1* | 7/2013 | Dasgupta | G06F 9/5072 718/1 |
| 2013/0275960 A1* | 10/2013 | Kirchev | G06F 8/61 717/175 |
| 2014/0089509 A1* | 3/2014 | Akolkar et al. | 709/226 |

OTHER PUBLICATIONS

Prodan, Radu, and Vlad Nae. "Prediction-based real-time resource provisioning for massively multiplayer online games." 2009. Future Generation Computer Systems 25.7: pp. 785-793.*

* cited by examiner

PRE-PROVISIONING RESOURCES FOR COMPOSITE APPLICATIONS

TECHNICAL FIELD

Embodiments of the invention relate generally to resource provisioning, and more specifically to the provisioning of resources for nodes in composite applications.

BACKGROUND

A composite application is an application that combines multiple application components, each of which may be a distinct application, into a new application. Each of the application components may have different criteria for hardware resources and/or for software resources. Provisioning a composite application may include provisioning the application components on different servers and then connecting those application components to form the composite application.

Composite applications are typically extensively tested prior to deployment. To test a composite application, multiple different scenarios may be set up and tested. Each scenario may involve the provisioning of different application components on different sets of hardware resources. Setting up and executing such tests using traditional provisioning solutions can be time consuming and difficult.

BRIEF DESCRIPTION OF THE DRAWINGS

The invention will be understood more fully from the detailed description given below and from the accompanying drawings of various embodiments of the invention. The drawings, however, should not be taken to limit the invention to the specific embodiments, but are for explanation and understanding only.

DETAILED DESCRIPTION

Figure 1:
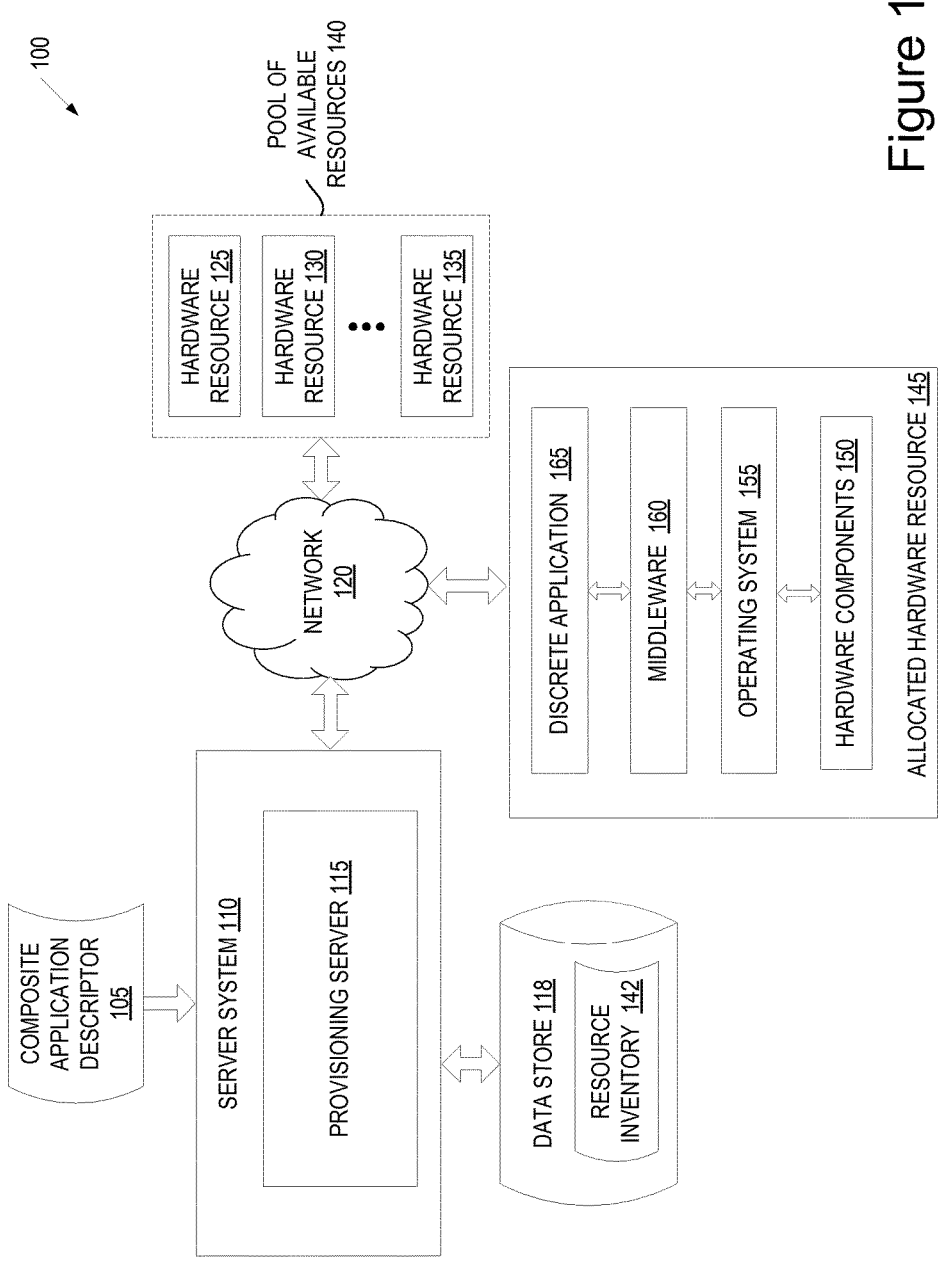
FIG. 1 is a block diagram of an example network architecture in which embodiments of the present invention may operate.

Embodiments of the invention describe a provisioning system that provisions composite applications. The provisioning may be performed in an automated manner, with little or no user interaction. In one embodiment, the provisioning system provides for generic resource descriptors that can describe the properties of hardware and software resources, and application descriptors that can describe the criteria of application components for a composite application. By maintaining a list of resource descriptors for available resources and comparing these resource descriptors to provided application descriptors, the provisioning system may automatically select resources to provision application components to and perform provisioning of these application components.

In one embodiment, the provisioning system performs automated provisioning of the composite application to hardware resources. The composite application to be provisioned may include a combination of application components, each of which may be a distinct application with its own hardware and software criteria. For example, the composite application may be a web service, such as an online news service, a blog service or a social networking service. Such a composite application may be a 3-tier application having an interface tier (e.g., a web server), a business logic tier (e.g., an application server) and a data tier (e.g., a database management system).

The provisioning system may include an inventory of available hardware resources, with the inventory including resource descriptors for those hardware resources. For each application component of the composite application, the provisioning system may determine criteria for that application component based on an application descriptor. The provisioning system may then automatically select an appropriate hardware resource for the application component by searching through the list of available hardware resources for hardware resources having resource descriptors that indicate hardware properties that satisfy the criteria. The provisioning system may then provision the application component on the identified hardware resource, and may connect the provisioned application components to form the composite application.

In some instances, the composite application may be identified in a test description. The test description may describe the composite application as well as one or more tests to perform on the composite application. Once the composite application is set up, an automated tester may test the composite application in accordance with the test descriptor.

By automating the process of selecting hardware resources and provisioning application components of composite applications to those hardware resources, embodiments of the present invention reduce the time and effort that an administrator spends to provision systems. For the testing of composite applications, many different scenarios of application installations may be set up and tested. In such situations, the time savings for administrators can be significant. Additionally, user errors in the provisioning process for composite applications may be reduced or eliminated. Embodiments of the present invention enable multiple tests to be set up in parallel, and further enable resources to be automatically reused for additional tests when present tests are complete. Any type of composite application may be created, and any combination of tests may be performed on the composite application, all in an automated manner with little to no user interaction.

Application components may have criteria for both hardware resources and for software resources. Criteria for software resources may include criteria for a particular operating system (e.g., Windows® Server 2010, Red Hat® Enterprise Linux® 5, OS X® 10.3, etc.), for a particular middleware or framework (e.g., a Java virtual machine, a web server, etc.), and so on. Many application components for different composite applications may use the same or similar software resources (e.g., the same operating system and/or middleware) and/or hardware resources. In one embodiment, the provisioning system predicts combinations of hardware resources and software resources that will likely be requested for future composite applications. The provisioning system may then select an appropriate hardware resource and install appropriate software resources (e.g., operating system and/or middleware) on the selected hardware resource to create a pre-provisioned resource having an intermediate provisioned state. Once a request for a composite application is received, processing logic may select a resource having an intermediate provisioned state that satisfies hardware and software criteria of an application component in the composite application. The provisioning server may then complete provisioning of the pre-provisioned resource for the application component. An amount of time that it takes to bring the pre-provisioned resource into a fully provisioned state may be considerably less than an amount of time that it takes to provision a resource from scratch.

FIG. 1 illustrates an example network architecture 100 in which embodiments of the present invention may operate. The network architecture 100 includes a system server connected to a pool of available resources 140 and an allocated hardware resource 145 via a network 120. The network 120 may be a private network (e.g., a local area network (LAN), wide area network (WAN), intranet, etc.), a public network (e.g., the Internet), or a combination thereof.

The pool of available resources 140 includes multiple hardware resources 125, 130, 135 that may be used to provision applications (e.g., application components for composite applications). Hardware resources 125, 130, 135 may include computing devices having various hardware properties and components. The hardware resources 125, 130, 135 may include, for example, desktop computers, laptop computers, rackmount servers, routers, switches, tablet computers, mobile phones, or any other type of computing device. Hardware resources 125, 130, 135 may include one or more processing devices, memory, and/or additional devices such as a graphics card, hardware RAID controller, network controller, hard disk drive, universal serial bus (USB) device, internal input/output (I/O) device, keyboard, mouse, speaker, etc. Different hardware resources may have different amounts of memory, different communication capabilities, different levels of storage space, different processing power, and so forth. For example, a first hardware resource may include four network adapters, and a second hardware resource may include only a single network adapter. The hardware resources may have any combination of hardware properties and/or hardware components.

Though not illustrated, the pool of available resources 140 may also include available virtual machine resources (not shown). Each virtual machine resource may include a virtual machine (VM), which may be configured to operate on a particular hypervisor (also known as a virtual machine monitor (VMM)) that emulates an underlying hardware platform for the VM. A virtual machine is a combination of guest software that uses an underlying emulation of a host machine. Virtual machines can be, for example, hardware emulation, full virtualization, para-virtualization, and operating system-level virtualization virtual machines. A virtual machine resource may include a running virtual machine having a combination of guest software, which may include a guest operating system, guest middleware, device drivers, etc.

Server system 110 may be a rackmount server, a workstation, a desktop computer, a notebook computer, a tablet computer, a mobile phone, a palm-sized computing device, a personal digital assistant (PDA), etc. Server system 110 may be coupled to one or more data stores 118, which may be local data stores or network data stores such as a storage area network (SAN), network attached storage (NAS) or cloud based storage (e.g., storage as a service (SaaS)).

Server system 110 includes a provisioning server 115 that provisions composite applications. Provisioning server 115 may receive a composite application descriptor 105, and may start the provisioning process using the received composite application descriptor 105. Composite application descriptors may be flexible descriptors that are usable to generically define any combination of application components for a composite application. The composite application descriptor 105 may define a collection of nodes for the composite application. Each node may include a distinct application that will be connected to other distinct applications of other nodes to form the composite application. The composite application descriptor 105 may include a separate application descriptor for each node of a composite application. Each application descriptor may identify hardware resource criteria and software resource criteria for the application component. Application descriptors may additionally include information identifying how to install the application component, where to install the application component from, what the application component consists of (e.g., one or more software modules of the application component), a configuration of the application component and/or other software for a node, and so on.

In one embodiment, provisioning server 115 maintains a resource inventory 142 that identifies those hardware resources 125, 130, 135 in the pool of available resources 140. The resource inventory 142 may include an entry for each of the available hardware resources 125, 130, 135 in the pool of available resources 140. Each entry may include a resource descriptor for a particular hardware resource 125, 130, 135. The resource descriptor may describe the properties and hardware components of the particular hardware resource. For example a resource descriptor for a hardware resource may identify a four core 3.2 gigahertz (GHz) processing device, two network adapters, 512 gigabytes (GB) of memory, 1 terabyte of storage, a physical location of Reno Nev., and an indication that the hardware resource is in a secure environment (e.g., behind a firewall).

Provisioning server 115 may perform searches of the available resource inventory 142 using the application descriptors for the nodes of the composite application included in the composite application descriptor 105. The hardware resource criteria in an application descriptor may be used to search within the available resource inventory 142 for a hardware resource that satisfies the hardware resource criteria. Once a hardware resource that satisfies the hardware resource criteria is identified, provisioning server 115 may use other information from the application descriptor (referred to herein collectively as provisioning data) to provision the application component on the selected hardware resource. Such provisioning data may include an identification of an operating system to install, where to install the operating system from (e.g., an internet protocol address and/or universal resource indicator identifying a location of an installer for the operating system), how to configure the operating system, middleware to install, where to install the middleware from, a configuration of the middleware, an application to install, and so on. Provisioning the application component on the hardware resource may include performing a network installation of an operating system, middleware and/or specific application or applications to the hardware resource. Responsive to a hardware resource being allocated for a composite application, that hardware resource may be removed from the available resource inventory 142 and/or may be flagged as being in use.

An example allocated hardware resource 145 is shown in the illustrated example network architecture 100. The allocated hardware resource 145 includes a collection of hardware components 150 that satisfy hardware resource criteria for a particular node of a composite application. Installed on the hardware components is an operating system 155 and middleware 160 that satisfies software criteria for the particular node. Installed on the operating system 155 and middleware 160 is a discrete application 165, which is the application component for the particular node of the composite application.

In one embodiment, the composite application descriptor 105 is included in a test descriptor (not shown). The test descriptor describes a particular composite application (via the composite application descriptor) as well as one or more tests to be performed on that composite application. Once the composite application has been set up as per the composite application descriptor, the one or more tests defined in the test descriptor are performed on the composite application. After the test (or tests) is complete, the hardware resources may be returned to the pool of available hardware resources 140 for reuse.

In one embodiment, provisioning server 115 pre-provisions one or more available resources. Provisioning server 115 may pre-provision both hardware resources and virtual machine resources. Pre-provisioning a resource may include predicting resource components for multiple composite applications that are likely to be provisioned in the future, determining an intermediate state that is common to the multiple composite applications, and then provisioning software components on available hardware resources to cause those available hardware components to have the intermediate state. For example, a pre-provisioned hardware resource may correspond to allocated hardware resource 145, but without the installed discrete application 165.

Figure 2:
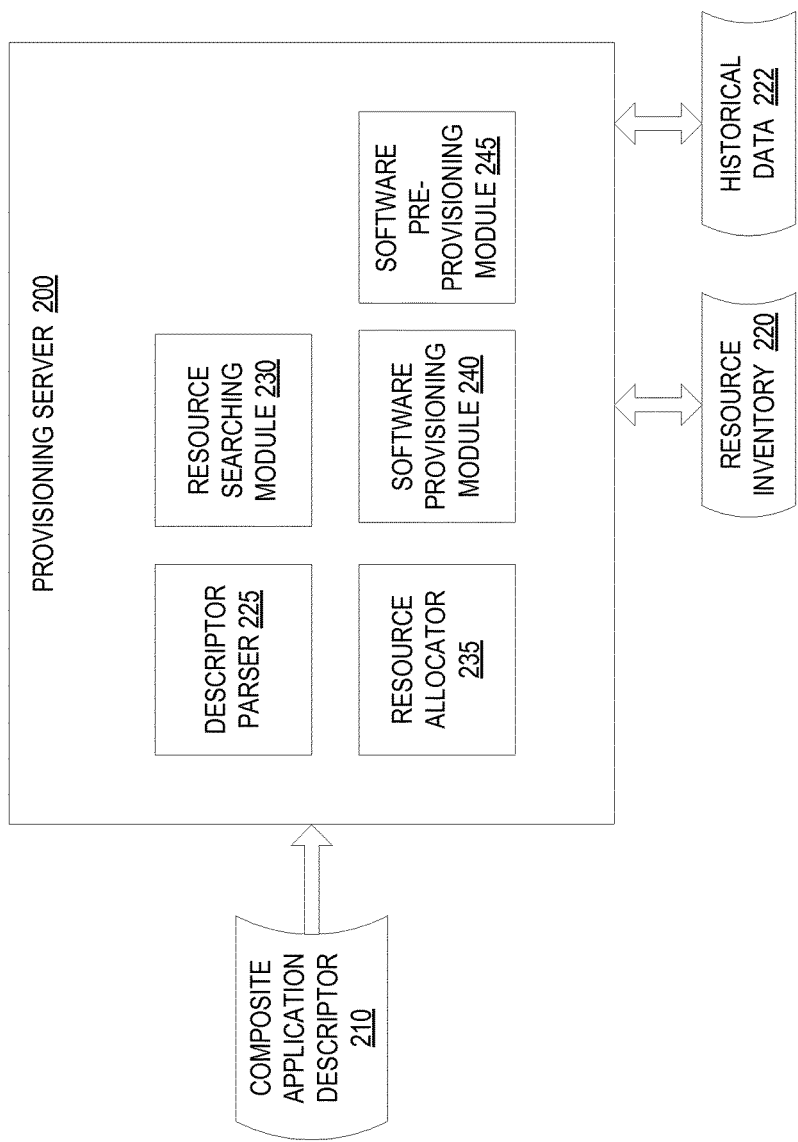
FIG. 2 is a block diagram of a provisioning server, in accordance with one embodiment of the present invention.

FIG. 2 is a block diagram of a provisioning server 200, in accordance with embodiments of the present invention. The provisioning server 200 may include a descriptor parser 225, a resource searching module 230, a resource allocator 235, a software provisioning module 240 and a software pre-provisioning module 245. Alternatively, the functionality of one or more of the descriptor parser 225, resource searching module 230, resource allocator 235, software provisioning module 240 and software pre-provisioning module 245 may be combined into a single module or separated into additional modules.

Provisioning server 200 may receive a composite application descriptor 210 defining a composite application to be provisioned. The composite application descriptor 210 may or may not be a component of a test descriptor that additionally defines a test to be performed on the composite application. For tests, it is beneficial to perform tests from a predefined clean state. The clean state may be a known state of a system (e.g., without any unknowns) after an operating system, middleware and application have been installed on a hardware resource, without any additional activity having been performed on the system (e.g., without running the application, without installing any additional applications, and so forth). This enables a system to start from the same controlled conditions for different tests, so that only one or a few controlled parameters are modified between tests, providing for an optimal testing environment.

In one embodiment, descriptor parser 225 parses the composite application descriptor 210. Parsing the composite application descriptor 210 may include analyzing the composite application descriptor 210 to create an internal representation of the composite application descriptor 210. Parsing the composite application descriptor 210 may include, for example, performing a lexical analysis, creating tokens based on the lexical analysis, and performing a syntactic analysis to create a parse tree.

Once the composite application descriptor 210 has been parsed, descriptor parser 225 may identify multiple nodes of the composite application, each of which defines an application component for the composite application. Each node may have a distinct node identifier. Descriptor parser 225 may additionally identify hardware resource criteria and/or software resource for each node. Examples of hardware criteria include hardware components such as a specific number of network adapters, a processing device with a specific number of cores and/or a specific processing power, a specific amount of memory, specific brands and models of hardware components, and so forth. Other examples of hardware resource criteria include hardware properties such as a geographic location of a hardware resource, whether the hardware resource resides in a secure environment or a non-secure environment, and so forth. Hardware resource criteria may also specify whether a node should be installed on a hardware resource, on a virtual machine resource, in a node hosted by a software as a service (SaaS) provider, and so forth. Alternatively, the composite application descriptor 210 may be received in a state such that no parsing is to be performed. In such an embodiment, descriptor parser 225 may identify the nodes and their hardware resources and/or software resources from the composite application descriptor 210 using the received state of the composite application descriptor 210.

Once the composite application descriptor 210 has been parsed (or without such parsing in one embodiment), resource searching module 230 searches through a resource inventory 220 to identify available hardware resources that satisfy the hardware resource criteria for the nodes of the composite application. Resource searching module 230 may search for an appropriate available hardware resource for each node of the composite application.

For each node of the composite application, resource allocator 235 allocates to that node the identified available hardware resource having hardware components and properties that satisfy the hardware criteria for the node. Allocating a hardware resource may include designating the hardware resource as being in use in the resource inventory 220. This may ensure that the hardware resource is not re-provisioned for another composite application while it is in use. Resource allocator 235 may additionally assign a unique composite application identifier to the composite application, and may associate that composite application identifier with the allocated hardware resource. In addition, resource allocator 235 may associate a node identifier of the particular node to the hardware resource. The composite application identifier and node identifier may be recorded, for example, in the resource inventory 220.

Software provisioning module 240 may provision an application component as well as underlying software for a node on an allocated hardware resource (or virtual machine resource). The software may include computer readable instructions for an operating system, for middleware, and for applications. Initially, software provisioning module 240 may provision an operating system included in the software resource criteria for the node onto the hardware resource. In one embodiment, a network install of the operating system is automatically performed on the hardware resource. This may include causing the hardware resource to perform a network boot, which causes the hardware resource to boot up using a minimal operating system provided by the provisioning server or by another server. Once the hardware resource has booted up using the minimal operating system, it may begin downloading data for another operating system, and may subsequently install the other operating system. The other operating system may correspond to an operating system identified in the software resource criteria for the node of the composite application.

The software resource criteria for the node of the composite application may additionally identify middleware. Examples of middleware include the Java virtual machine, a web server, and so forth. Software provisioning module 240 may install the identified middleware on the hardware resource. Software provisioning module 240 may select a version of the middleware that is configured to run on the installed operating system.

After the middleware identified in the software resource criteria is installed, software provisioning module may provision the application component for the node. With each level of provisioned software (e.g., the operating system, the middleware and the application component), the software provisioning module 240 may configure that layer in accordance with configuration information included in the composite application descriptor 210. The configuration may designate which other nodes an application component of a particular node is to communicate with, how to perform the communication, as well as other configuration parameters.

After all of the nodes for the composite application have been provisioned, the software provisioning module 240 may cause the application components to load on their respective nodes, which may instantiate the composite application. If the composite application descriptor 210 was a component of a test descriptor, then an application tester (not shown) may instruct the composite application to perform specified operations in a specified sequence to bring about particular test conditions. Once the test has been completed, the application tester may notify provisioning server 200 that the composite application is no longer needed. In response, resource allocator 235 may de-allocate the hardware resources and place them back into a pool of available hardware resources. This may include updating a status of the hardware resources in the resource inventory 220 to indicate that they are not in use. In one embodiment, resource allocator 235 removes present installations of operating systems, middleware and application components on the hardware resources to return the hardware resources to a bare metal state.

Software pre-provisioning module 245 may perform many provisioning operations that are similar to those provisioning operations described above with reference to software provisioning module 240. However, software pre-provisioning module 245 may perform such provisioning operations without first receiving a composite application descriptor or a request to provision a composite application. Additionally, software pre-provisioning module 245 provisions both hardware resources and software resources to an intermediate provisioned state rather than a final provisioned state specified in a composite application descriptor 210.

Software pre-provisioning module 245 may determine the intermediate state for a resource by performing a statistical analysis of historical data 222. The historical data 222 may include information identifying previously provisioned composite applications. The statistical analysis may be used to predict intermediate states of application components that are likely to be used in the future. The historical data 222 may be filtered based on a time range (e.g., composite applications provisioned in the last week, in the last 24 hours, from January 1 through January 5, etc.), a type of test performed on composite applications, a type of composite application, or other criteria. This may adjust results of the statistical analysis to more accurately predict future composite applications. Software pre-provisioning module 245 may then pre-provision hardware resources to the identified intermediate states. The software pre-provisioning module 245 is described in greater detail below with reference to FIG. 3.

Figure 3:
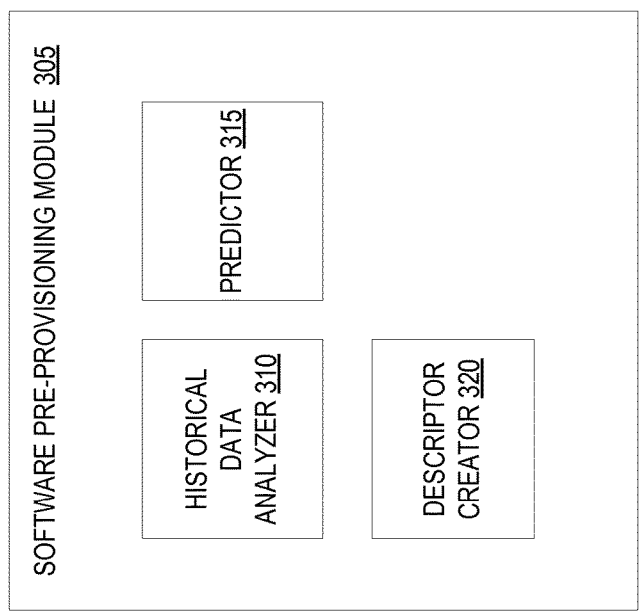
FIG. 3 is a block diagram of one embodiment of a pre-provisioning module, which may be a component of a provisioning server.

FIG. 3 is a block diagram illustrating one embodiment of a software pre-provisioning module 305. The software pre-provisioning module 305 includes a historical data analyzer 310, a predictor 315 and a description creator 320. In one embodiment, the software pre-provisioning module 305 is a component of provisioning server 205 of FIG. 2.

Historical data analyzer 310 analyzes historical data on composite applications and/or on tests performed on composite applications. In one embodiment, historical data analyzer 310 performs statistical analysis on the composite applications and/or tests. However, other types of analysis may also be performed.

Performing statistical analysis on the composite applications may include performing statistical analysis on the nodes of those composite applications. Each node may be considered independently from a composite application that it is associated with for some statistical analysis. For other statistical analysis, the composite applications that nodes are associated with may be taken into consideration. The statistical analysis may be performed to identify statistics on the usage of hardware resources, the usage of operating systems, the usage of middleware and/or the usage of discrete applications (e.g., which may be used as application components). The statistical analysis may provide historical statistics on nodes for composite applications, statistics on recent nodes, trend data on the composition of nodes, and so forth. For example, the statistical analysis may identify the percentage of nodes in composite applications that were provisioned on hardware resources having specific hardware components and properties, the percentage of nodes running particular operating systems, the percentage of nodes running particular middleware, and so forth.

Historical data analyzer 310 may categorize historical data based on types of composite applications (e.g., online sales applications, online banking applications, virtual machine management applications, etc.), entities associated with the composite applications (e.g., customers that the composite applications are developed for), location, date, time, and application components. These values may be determined for recent composite applications, for composite applications over specified time ranges, for specific types of composite applications, and so forth. The historical data may alternatively or additionally be categorized along other lines.

Based on the statistical analysis, predictor 315 may predict that a node of a composite application will have a particular intermediate provisioned state. For example, if over a last week 60% of nodes for composite applications included the Red Hat Enterprise Linux 6 (RHEL 6) operating system, then historical data analyzer 310 may predict that a future node will also include the RHEL 6 operating system. The intermediate provisioned state may include an installed operating system, an installed middleware and/or an installed application that will be a component of the composite application. For example, based on the statistical analysis, the historical data analyzer 310 may determine that 60% of nodes include RHEL 6, 40% of nodes additionally include the Java virtual machine installed on RHEL 6, and 20% of nodes may additionally include a particular application on the Java virtual machine and on RHEL 6. Based on this data, historical data analyzer 310 may predict that there is a high probability that a future node will run RHEL 6, there is a slightly lower probability that a future node will additionally run Java, and there is an even lower chance that a future node will additionally run the particular application. In addition to having installations of particular operating systems, middleware and/or applications, predicted intermediate provisioned states may also have particular configurations for any of the operating system, middleware and/or application.

Predictor 315 may predict multiple different application components that are likely to be requested for provisioning in the future. Each of the predicted application components may have a different final provisioned state. The historical data analyzer 310 may then determine a common intermediate state that is shared by multiple different predicted application components. For example, if ten different predicted application components are all to be installed on systems that included the Red Hat Enterprise Linux 6 (RHEL 6) operating system, then the common intermediate state may be a clean installation of RHEL 6.

Descriptor creator 320 may generate pre-provisioned resource descriptors that describe the intermediate provisioned state for a pre-provisioned resource. The pre-provisioned resource descriptor may identify hardware criteria and well as software criteria. The software criteria may specify an operating system, middleware and/or application to provision on a resource to cause the resource to become a pre-provisioned resource with an intermediate provisioned state. Once a pre-provisioned resource descriptor is generated, software provisioning module 305 may provide the pre-provisioned resource descriptor to a resource searching module (e.g., resource searching module 230 of FIG. 2). Software pre-provisioning module 305 may then provision one or more software components on a resource allocated by a resource allocator to cause the resource to have an intermediate provisioned state.

Referring back to FIG. 2, software pre-provisioning module 245 may update a resource inventory 220 to identify pre-provisioned resources having intermediate provisioned states. When resource searching module 230 searches the resource inventory 220 for resources that meet specific criteria, resource searching module 230 may search for both matching hardware criteria and matching software criteria. The software criteria may be used to determine whether any pre-provisioned resources have an intermediate provisioned state that is compatible with a final provisioned state of a node for the composite application. Resource searching module 230 may search for a resource with a best match. For example, a pre-provisioned resource having hardware properties and components that match hardware criteria and an installed operating system and middleware that satisfies software criteria would be selected over a pre-provisioned resource having hardware properties and components that match the hardware criteria and an installed operating system that satisfies the software criteria. If a pre-provisioned resource includes installed software not specified in a composite application descriptor 210, that pre-provisioned resource may be excluded from consideration.

FIGS. 4-8 are flow diagrams showing various methods for provisioning composite applications and for pre-provisioning software. The methods may be performed by a computing device that may comprise hardware (e.g., circuitry, dedicated logic, programmable logic, microcode, etc.), software (e.g., instructions run on a processing device to perform hardware simulation), or a combination thereof. In one embodiment, at least some operations of the methods are performed by a provisioning server 200 of FIG. 2.

Figure 4:
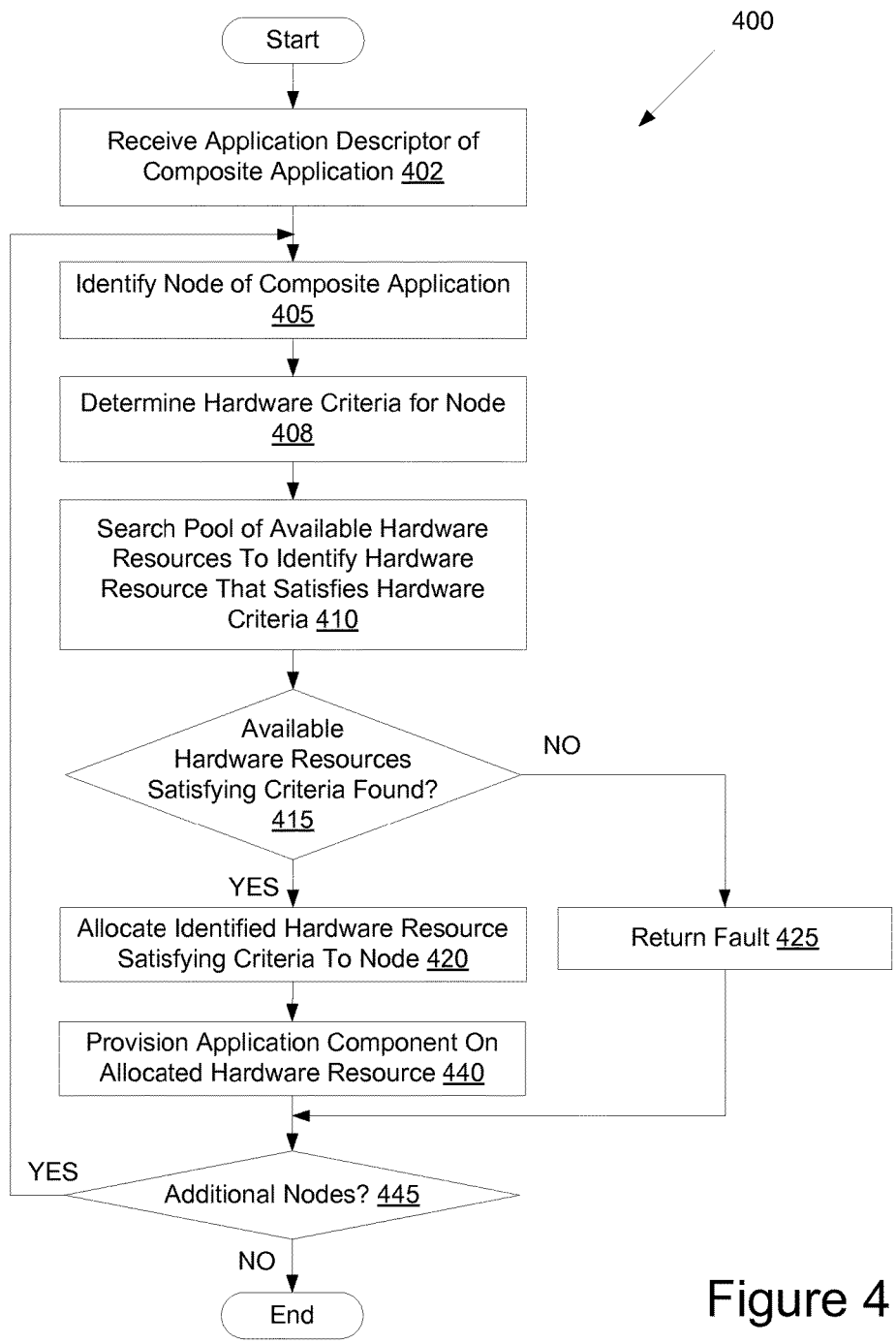
FIG. 4 is a flow diagram illustrating one embodiment of a method for provisioning a composite application on hardware resources.

FIG. 4 is a flow diagram illustrating one embodiment of a method 400 for provisioning a composite application on hardware resources. At block 402 of method 400, processing logic receives an application descriptor for a composite application. The application descriptor may be included in a test descriptor that defines the composite application and one or more tests to be performed on the composite application. At block 405, processing logic identifies a node of the composite application. At block 408, processing logic determines hardware criteria for the identified node.

At block 410, processing logic searches a pool of available hardware resources to identify a hardware resource that satisfies hardware criteria of the identified node. At block 415, processing logic determines whether an available hardware resource that satisfies the hardware criteria has been found. If no such hardware resource is found, the method continues to block 425, and a fault is returned. If an available hardware resource satisfying the specified resource criteria is found, the method continues to block 420.

At block 420, processing logic allocates the identified hardware resource having hardware properties and/or components that satisfy the hardware criteria to the node of the composite application. At block 440, processing logic provisions an application component of the node on the hardware resource. This may include downloading and installing an operating system on the hardware resource, downloading and installing middleware on the hardware resource and/or downloading and installing an application on the hardware resource.

At block 445, processing logic determines whether the composite application includes any additional nodes to be provisioned. If so, the method returns to block 405, and one of the additional nodes is identified for provisioning. Otherwise the method ends.

Figure 5:
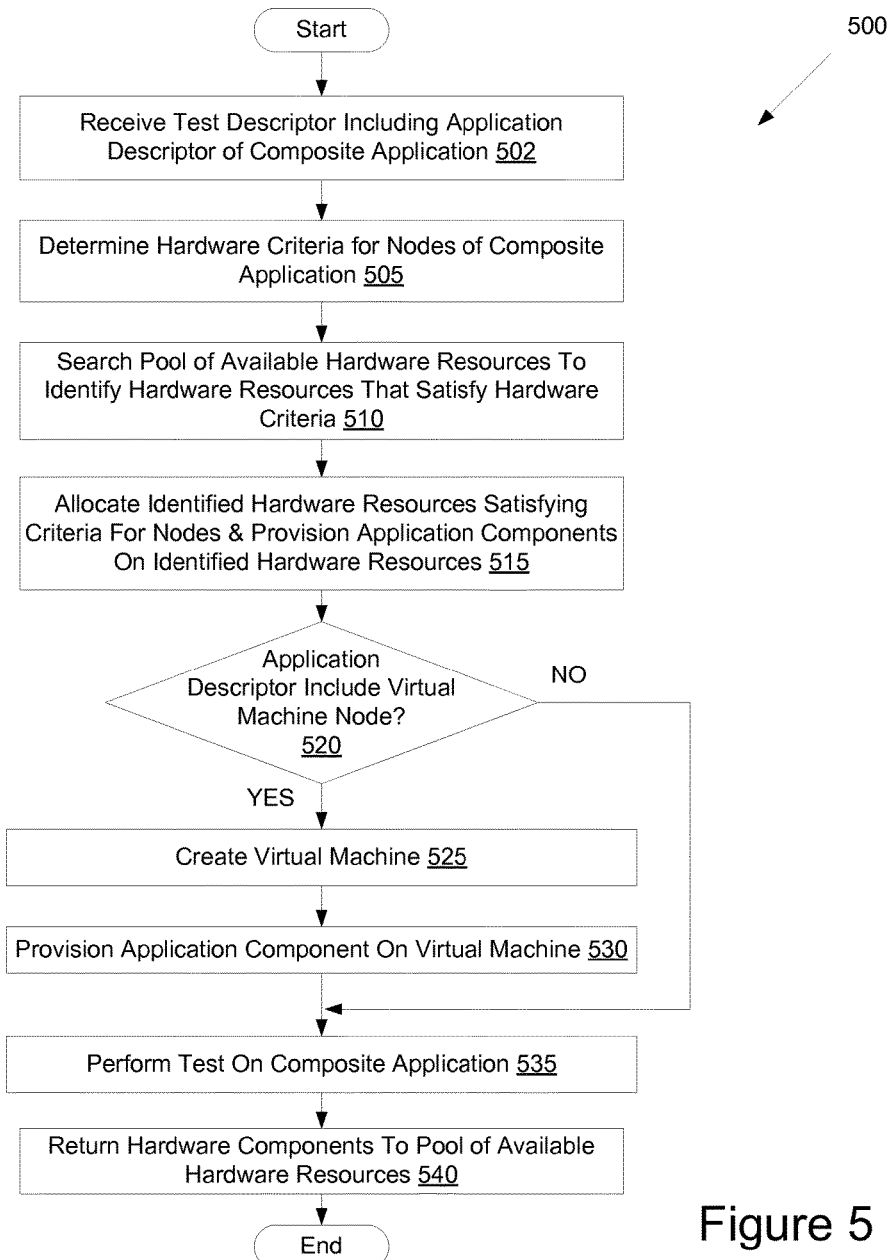
FIG. 5 is a flow diagram illustrating one embodiment of a method for setting up a test environment for a composite application and testing the composite application.

FIG. 5 is a flow diagram illustrating one embodiment of a method 500 for setting up a test environment for a composite application and testing the composite application. At block 502 of method 500 processing logic receives a test descriptor that includes an application descriptor for a composite application as well as a test to perform on the composite application. At block 505, processing logic determines hardware criteria for nodes of the composite application. At block 510, processing logic searches a pool of available resources to identify hardware resources that satisfy the hardware criteria for the nodes. At block 515, processing logic allocates the identified hardware resources satisfying the criteria for the nodes of the composite application and provisions application components of the nodes on the identified hardware resources.

In addition to defining hardware resources for nodes, the composite application descriptor may also define nodes that do not have any hardware resources, such as virtual machine nodes. A virtual machine node may include a virtual machine that has particular properties that satisfy criteria similar to the hardware criteria. At block 520, processing logic processing logic determines whether the composite application descriptor includes descriptors for any virtual machine nodes. If the composite application descriptor does not include any virtual machine nodes (e.g., only includes nodes that run on hardware resources), the method proceeds to block 535. Otherwise, the method continues to block 525.

At block 525, processing logic creates a virtual machine. The created virtual machine may have properties and virtual components that satisfy criteria specified in the composite application descriptor for the virtual machine node. For example, the virtual machine may have a specified amount of available memory, a specified processing power, and so forth. At block 530, processing logic provisions a component of the composite application on the virtual machine. This may be performed in the same manner as provisioning a composite application on a hardware resource. For example, an operating system may be installed on the virtual machine, middleware may be installed on the operating system, and an application may be installed on the operating system. In some instances, processing logic may have snapshots of frequently used nodes of composite applications. In such an instance, if the node corresponds to a frequently used node for which a snapshot has been taken, processing logic may simply load the pre-generated snapshot that includes the provisioned application component.

At block 535, processing logic performs a test (or a series of tests) on the composite application. At block 540, processing logic returns the hardware resources to the pool of available hardware resources. Therefore, the hardware resources may be reused for other tests and composite applications.

Figure 6:
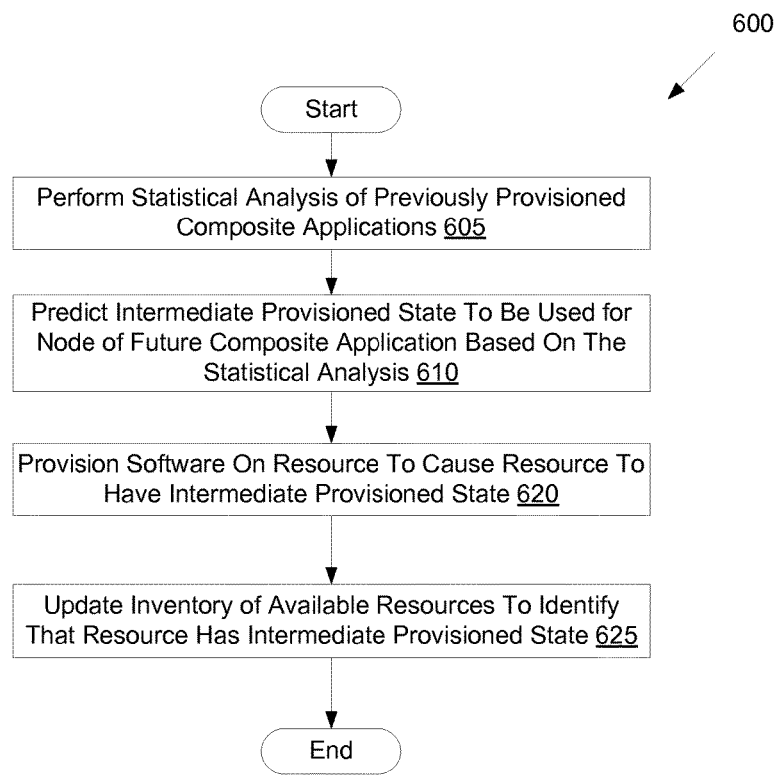
FIG. 6 is a flow diagram illustrating one embodiment of a method for pre-provisioning resources for use in composite applications.

FIG. 6 is a flow diagram illustrating one embodiment of a method 600 for pre-provisioning resources for use in composite applications. It can take considerable time to provision and set up complex composite applications and test scenarios. For example, some composite applications may take 5-10 minutes or more to provision. However, many composite applications and tests use nodes that start from the same initial clean state (e.g., the same operating system and/or the same middleware), which is referred to herein as the intermediate provisioned state. Method 600 may be performed to pre-provision software on resources to cause those resources to have such intermediate provisioned states. Such pre-provisioning can significantly reduce an amount of time that it takes to provision a composite application after receiving a request for a particular composite application or a particular test. For example, the time to provision a composite application may be reduced by as much as 80% (e.g., to reduce a 5-10 minute provisioning procedure to a 1-2 minute provisioning procedure).

At block 605 of method 600, processing logic performs statistical analysis of previously provisioned composite applications. The statistical analysis may provide statistics on the usage of various operating systems, middleware and/or applications in nodes of composite applications. Such statistics may include statistics on historical usage and recent usage, and may identify trends. For example, a mean number of nodes provisioned per day having a particular operating system may be identified along with a standard deviation. Nodes that were more recently provisioned may be weighted more heavily to calculate a weighted mean. For example, an exponentially weighted moving average may be computed.

At block 610, processing logic predicts an intermediate provisioned state to be used for a node of a future composite application based on the statistical analysis. The intermediate provisioned state may include some software components that will be included in a future node of a composite application, such as a particular operating system and/or a particular middleware. However, the intermediate provisioned state may lack a specific application component that is to be tested and/or may lack a specific configuration that is to be used for the node of the composite application.

At block 620, processing logic provisions software on a resource to cause the resource to have the intermediate provisioned state. At block 625, processing logic updates an inventory of available resources to identify that the resource has the intermediate provisioned state. Therefore, the resource may be identified in the inventory as a pre-provisioned resource rather than a bare metal resource.

Figure 7:
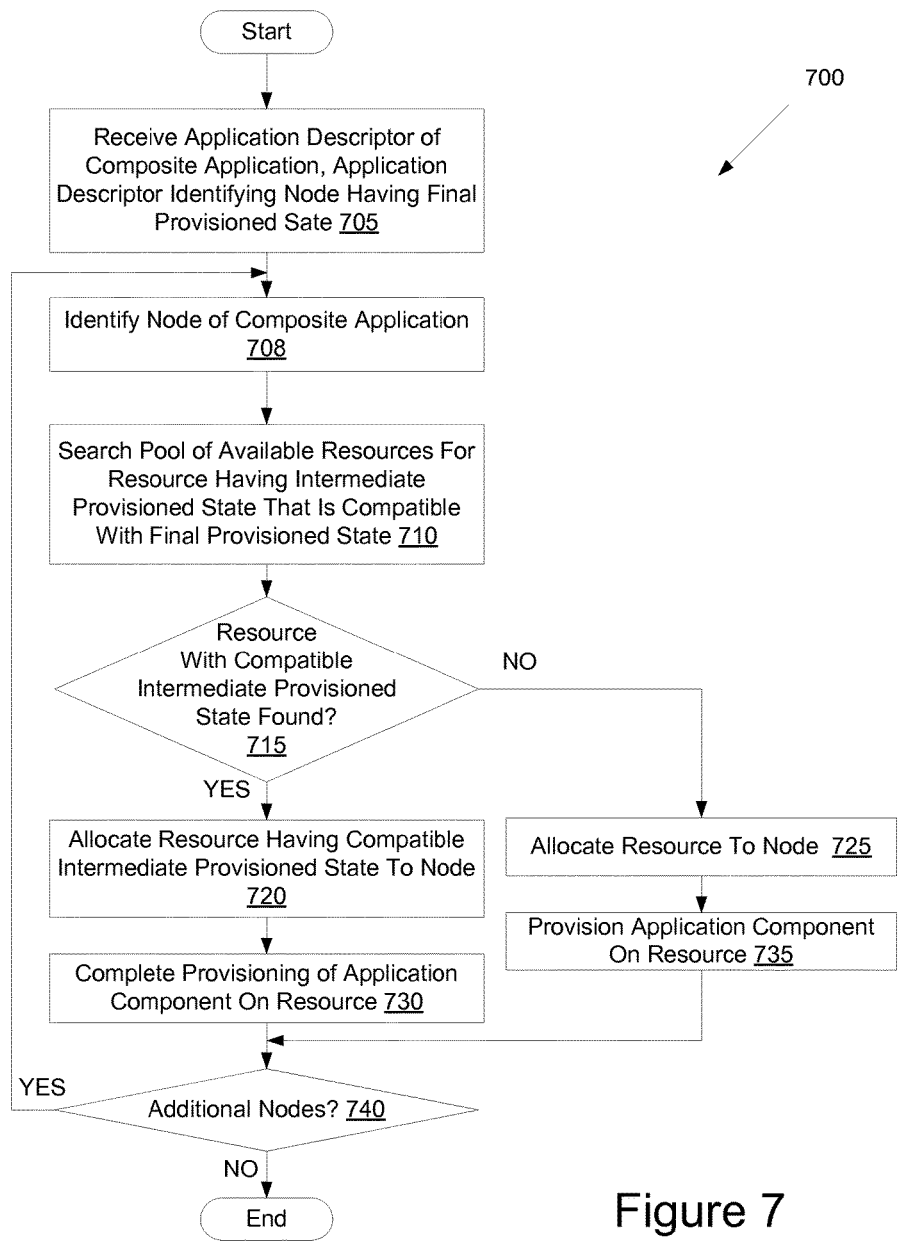
FIG. 7 is a flow diagram illustrating one embodiment of a method for provisioning resources for use in composite applications.

FIG. 7 is a flow diagram illustrating one embodiment of a method 700 for provisioning resources for use in composite applications. At block 705 of method 700 processing logic receives an application descriptor of a composite application. The application descriptor identifies a collection of nodes and final provisioned states for those nodes. At block 708, processing logic identifies a particular node of the collection of nodes.

At block 710, processing logic searches a pool of available resources for a resource having an intermediate provisioned state that is compatible with the final provisioned state of the node. At block 715, processing logic determines whether a resource with a compatible intermediate provisioned state has been identified. An intermediate provisioned state is compatible with a final provisioned state if the intermediate provisioned state satisfies software criteria of the application descriptor for the node. For example, if the intermediate provisioned state can be changed to the final provisioned state by installing additional software, then the intermediate provisioned state may be compatible with the final provisioned state. A resource with an intermediate provisioned state with an installed RHEL 6 operating system (but no other installed software) would likely be compatible with a final provisioned state that specifies a node having the RHEL 6 operating system, Java and a particular application component. If no such resource has been identified, the method continues to block 725. If a resource having a compatible intermediate provisioned state is identified, the method proceeds to block 720.

At block 725, an un-provisioned resource is allocated for the node. The un-provisioned resource may be a bare metal resource (e.g., a computing device without an operating system, a file system, or other installed software), an empty virtual machine, or other resource that has not had any software provisioned to it. At block 735, the application component is provisioned on the resource. This includes first downloading and installing an operating system on the resource, installing middleware (if any is called for in the application descriptor), and installing an application that will participate in the composite application. Provisioning the application component may additionally include configuring one or more of the operating system, middleware and application.

At block 720, processing logic allocates a pre-provisioned resource having a compatible intermediate provisioned state for the node. At block 730, processing logic completes provisioning of the application component on the resource. The pre-provisioned resource will already have at least an installed operating system, and potentially an installed middleware and/or an installed application. Completing the provisioning includes installing those software components that are not already installed on the resource and configuring those software components. Completing the provisioning may additionally include configuring those software components that were already installed in the intermediate provisioned state. For example, if the intermediate provisioned state included just an operating system, then completing the provisioning of the application component on the resource may include configuring the operating system, installing and configuring middleware, and installing and configuring the application component.

At block 740, processing logic determines whether there are any additional nodes that still need to be provisioned. If so, the method continues to block 708. Otherwise, the method ends.

Figure 8:
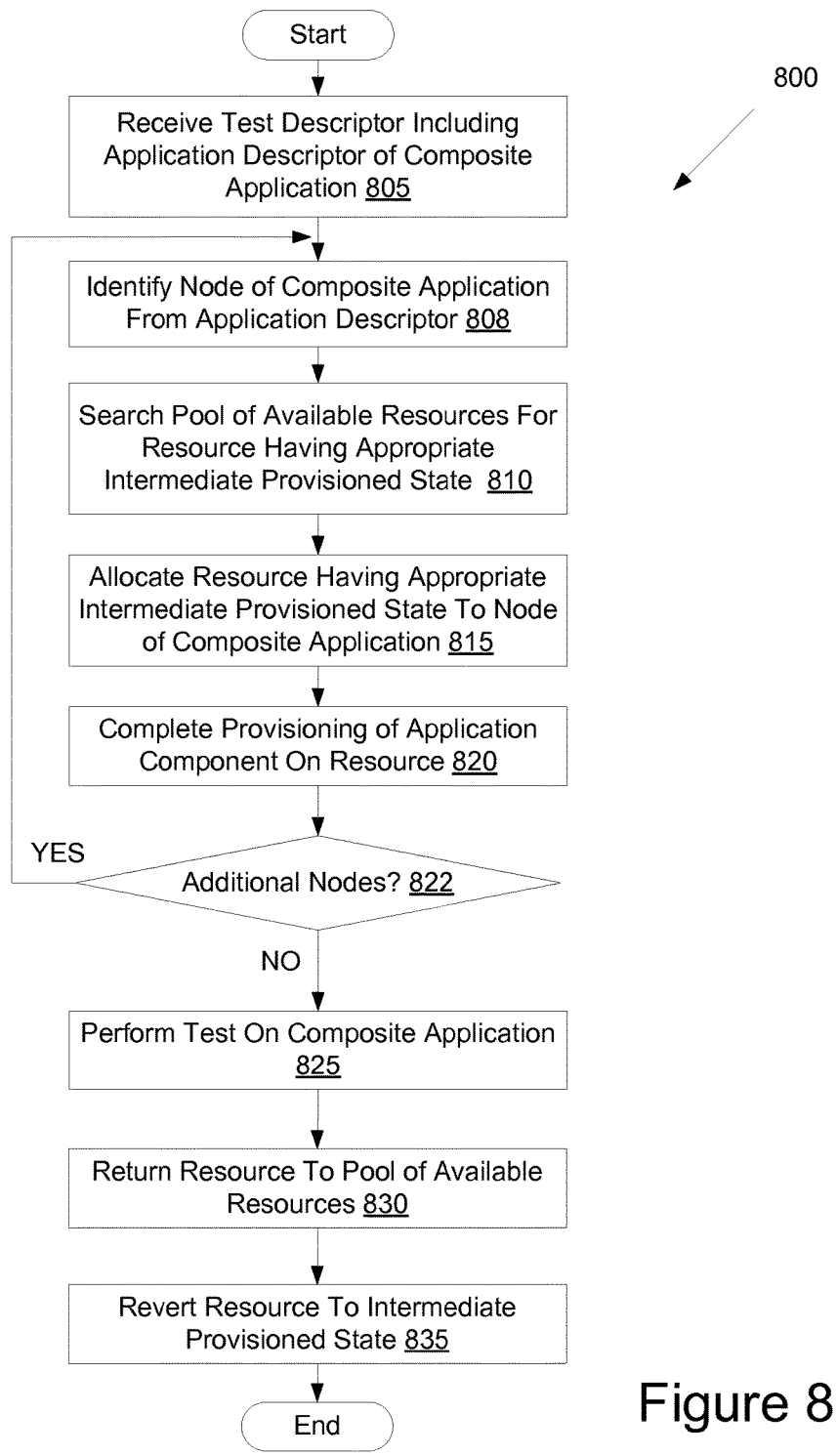
FIG. 8 is a flow diagram illustrating another embodiment of a method for setting up a test environment for a composite application and testing the composite application.

FIG. 8 is a flow diagram illustrating another embodiment of a method 800 for setting up a test environment for a composite application and testing the composite application. At block 805 of method 800 processing logic receives a test descriptor that includes an application descriptor for a composite application. At block 808, processing logic identifies a node of the composite application from the application descriptor.

At block 810, processing logic searches a pool of available resources for a pre-provisioned resource having an appropriate intermediate provisioned state. An appropriate intermediate provisioned state is a state that is compatible with a final provisioned state specified in the composite application descriptor for the identified node.

At block 815, processing logic allocates a resource having the appropriate intermediate provisioned state to the node of the composite application. At block 820, processing logic completes provisioning of the application component on the resource for the node. At block 822, processing logic determines whether there are any additional nodes that need to be provisioned. If so, the method returns to block 808. Otherwise, the method continues to block 825.

At block 825, processing logic performs a test on the composite application. The test is defined in the received test descriptor. At block 830, after the test has been completed processing logic returns the resources that were assigned to the nodes of the composite application to the pool of available resources. At block 835, processing logic reverts one or more of these nodes to an intermediate provisioned state that they had prior to being allocated to a node of the composite application.

For virtual machine resources, returning the resource to an intermediate provisioned state may be performed by loading a snapshot of the resource that was taken at the intermediate provisioned state. However, returning a hardware resource to a previous intermediate provisioned state may be less straight forward. For example, returning a hardware resource to a previous intermediate provisioned state may include copying data (e.g., disk images) between data stores.

A data store (e.g., a hard disk drive) of a hardware resource may be divided into two or more partitions. A logical volume manager may be installed on the hardware resource. The logical volume manager may create a logic volume for the data store, and may map any one or more of the partitions to the logical volume. This logical volume may be presented to an operating system and/or file system as the data store.

In one embodiment, during a pre-provisioning process the logical volume manager maps a first partition of the data store to the logical volume. Therefore, all data that is installed during the pre-provisioning process (which is associated with an intermediate provisioned state), would be written to the first partition. The logical volume manager may then generate a snapshot of the intermediate provisioned state. The logical volume manager may then map the logical volume to both the first partition and to a second partition. All changes that are made to the intermediate provisioned state may be recorded in the second partition as differences from the intermediate provisioned state. When the hardware resource is de-allocated, the logical volume manager may revert the hardware resource to the intermediate provisioned state by loading the snapshot. This may reduce an amount of time that it takes to revert a hardware resource to an intermediate provisioned state. In one embodiment, a minimal operating system may be used to revert the hardware resource to the intermediate provisioned state.

Figure 9:
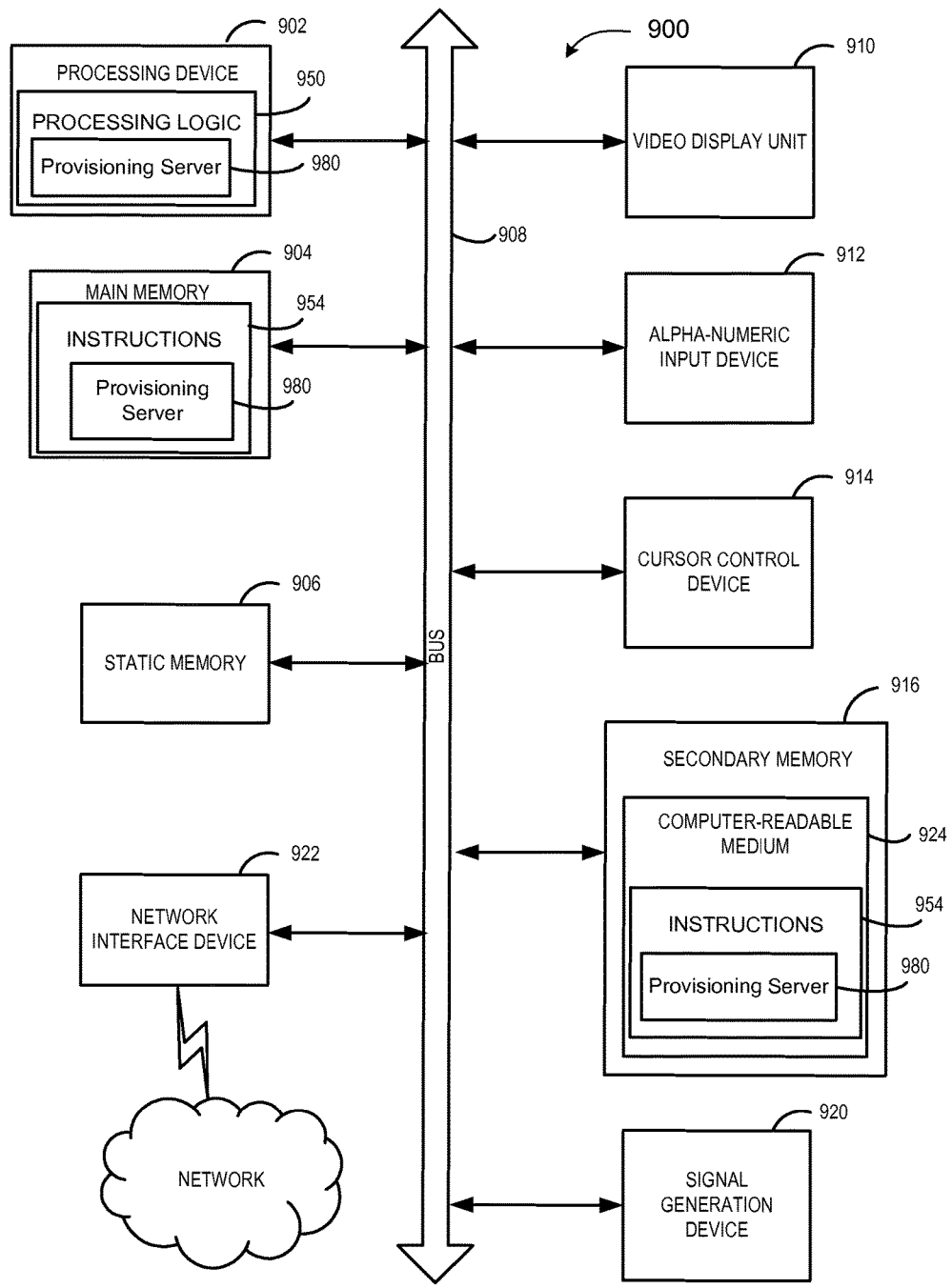
FIG. 9 illustrates a block diagram of one embodiment of a computer system.

FIG. 9 illustrates a diagrammatic representation of a machine in the example form of a computing device 900 within which a set of instructions, for causing the machine to perform any one or more of the methodologies discussed herein, may be executed. The computing device 900 may correspond to a host machine 125, a client device 105, 110 and/or virtualization controller 118 of FIG. 1. In embodiments of the present invention, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The example computing device 900 includes a processing device 902, a main memory 904 (e.g., read-only memory (ROM), flash memory, dynamic random access memory (DRAM) such as synchronous DRAM (SDRAM) or Rambus DRAM (RDRAM), etc.), a static memory 906 (e.g., flash memory, static random access memory (SRAM), etc.), and a secondary memory 916 (e.g., a data storage device), which communicate with each other via a bus 908.

The processing device 902 represents one or more general-purpose processors such as a microprocessor, central processing unit, or the like. The processing device 902 may include a complex instruction set computing (CISC) microprocessor, reduced instruction set computing (RISC) microprocessor, very long instruction word (VLIW) microprocessor, processor implementing other instruction sets, or processors implementing a combination of instruction sets. The processing device 902 may also be one or more special-purpose processing devices such as an application specific integrated circuit (ASIC), a field programmable gate array (FPGA), a digital signal processor (DSP), network processor, or the like.

The computing device 900 may further include a network interface device 922. The computing device 900 also may include a video display unit 910 (e.g., a liquid crystal display (LCD) or a cathode ray tube (CRT)), an alphanumeric input device 912 (e.g., a keyboard), a cursor control device 914 (e.g., a mouse), and a signal generation device 920 (e.g., a speaker).

The secondary memory 916 may include a machine-readable storage medium (or more specifically a computer-readable storage medium) 924 on which is stored one or more sets of instructions 954 embodying any one or more of the methodologies or functions described herein (e.g., provisioning server 980, which may correspond to provisioning server 200 of FIG. 2). The instructions 954 may also reside, completely or at least partially, within the main memory 904 and/or within the processing device 902 during execution thereof by the computer system 900; the main memory 904 and the processing device 902 also constituting machine-readable storage media.

While the computer-readable storage medium 924 is shown in an example embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing or encoding a set of instructions for execution by the machine that cause the machine to perform any one or more of the methodologies of the present invention. The term "computer-readable storage medium" shall accordingly be taken to include, but not be limited to, solid-state memories, and optical and magnetic media.

The modules, components and other features described herein (for example in relation to FIGS. 1-3) can be implemented as discrete hardware components or integrated in the functionality of hardware components such as ASICS, FPGAs, DSPs or similar devices. In addition, the modules can be implemented as firmware or functional circuitry within hardware devices. Further, the modules can be implemented in any combination of hardware devices and software components, or only in software.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "receiving", "determining", "allocating", "provisioning", "creating", or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the present invention also relate to an apparatus for performing the operations herein. This apparatus may be specially constructed for the discussed purposes, or it may comprise a general purpose computer system selectively programmed by a computer program stored in the computer system. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic disk storage media, optical storage media, flash memory devices, other type of machine-accessible storage media, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the method steps. The structure for a variety of these systems will appear as set forth in the description above. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. Although the present invention has been described with reference to specific example embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

What is claimed is:

1. A method comprising:
   performing, by a processing device, a statistical analysis of a plurality of previously provisioned composite applications, wherein a composite application of the plurality of previously provisioned composite applications corresponds to a plurality of nodes, wherein each of the plurality of nodes defines an application component of the composite application, wherein each of the plurality of nodes has a first final provisioned state for the application component, and wherein the first final provisioned state comprises hardware criteria and software criteria of the application component;
   predicting, by the processing device, future application components of future composite applications in view of the statistical analysis, wherein each of the future composite applications corresponds to an intermediate provisioned state of a plurality of intermediate provisioned states;
   identifying, from the intermediate provisioned states of the future composite applications, a common intermediate provisioned state that is shared by the predicted future application components of the future composite applications, the common intermediate provisioned state indicating 1) a same type of the hardware criteria and 2) a same type of the software criteria among the intermediate provisioned states of the future application components;
   responsive to identifying the common intermediate provisioned state, pre-provisioning a first future application component that shares the common intermediate provisioned state, wherein the pre-provisioning includes provisioning the common intermediate provisioned state on a resource to cause the resource to have the first future application component and the common intermediate provisioned state, and further wherein the resource comprises a hardware resource;
updating inventory of available resources to identify that the resource is pre-provisioned with the common intermediate provisioned state;
receiving a request to provision a new composite application comprising 1) a new software criteria including the first future application component and 2) a new hardware criteria including a destination node having a second final provisioned state;
determining, in view of the updated inventory, that the second final provisioned state of the destination node of the new composite application is compatible with the common intermediate provisioned state by comparing the new hardware criteria and the new software criteria of the second final provisioned state with the hardware criteria and the software criteria of the common intermediate provisioned state; and
responsive to a determination that the new hardware criteria and the new software criteria of the second final provisioned state is compatible with the hardware criteria and the software criteria of the common intermediate provisioned state, provisioning the new composite application and the future application components on the pre-provisioned resource, in accordance with the common intermediate provisioned state, and further allocating the pre-provisioned resource to the destination node having the second final provisioned state.

2. The method of claim 1, further comprising:
receiving an application descriptor of the new composite application in the request to provision the new composite application, the application descriptor identifying the destination node having the second final provisioned state for a particular application component of the new composite application;
determining that the resource having the common intermediate provisioned state is available;
allocating the resource to the destination node of the new composite application; and
completing provisioning of the particular application component on the resource to cause the destination node to have the second final provisioned state.

3. The method of claim 2, further comprising:
pre-provisioning a first software on the resource by installing at least one of an operating system on the resource or middleware on the resource; and
completing provisioning of the particular application component on the resource comprises installing at least one of the middleware or the particular application component on the resource.

4. The method of claim 2, wherein a first amount of time to perform the pre-provisioning of the first software on the resource to cause the resource to have the common intermediate provisioned state is at least twice a second amount of time to perform the completing of the provisioning of the application component on the resource to cause the resource to have the second final provisioned state.

5. The method of claim 1, wherein an application descriptor of the new composite application is included in a new test descriptor that defines a new test to run on the new composite application, and wherein the plurality of previously provisioned composite applications were used to perform a plurality of previous tests.

6. The method of claim 5, further comprising:
performing the new test on the new composite application; and
after completing the new test, causing the resource to revert to the common intermediate provisioned state and returning the resource to a pool of available resources for later use in future composite applications.

7. The method of claim 6, wherein the resource comprises a data store having:
a first partition containing data associated with the common intermediate provisioned state; and
a second partition containing additional data associated with the final provisioned state and subsequent changes to the final provisioned state; and
further wherein causing the resource to revert to the common intermediate provisioned state comprises:
instructing a logical volume manager to revert to a snapshot in the first partition.

8. A non-transitory computer readable storage medium having instructions that, when executed by a processing device, causes the processing device to:
perform, by the processing device, a statistical analysis of a plurality of previously provisioned composite applications, wherein a composite application of the plurality of previously provisioned composite applications corresponds to a plurality of nodes, wherein each of the plurality of nodes defines an application component of the composite application, wherein each of the plurality of nodes has a first final provisioned state for the application component, and wherein the first final provisioned state comprises hardware criteria and software criteria of the application component;
predict, by the processing device, future application components of future composite applications in view of the statistical analysis, wherein each of the future composite applications corresponds to an intermediate provisioned state of a plurality of intermediate provisioned states;
identify, from the intermediate provisioned states of the future composite applications, a common intermediate provisioned state that is shared by the predicted future application components of the future composite applications, the common intermediate provisioned state indicating 1) a same type of the hardware criteria and 2) a same type of the software criteria among the intermediate provisioned states of the future application components;
responsive to identifying the common intermediate provisioned state, pre-provision a first future application component that shares the common intermediate provisioned state, wherein the pre-provisioning includes provisioning the common intermediate provisioned state on a resource to cause the resource to have the first future application component and the common intermediate provisioned state, and further wherein the resource comprises a hardware resource;
update inventory of available resources to identify that the resource is pre-provisioned with the common intermediate provisioned state;
receive a request to provision a new composite application comprising 1) a new software criteria including the first future application component and 2) a new hardware criteria including a destination node having a second final provisioned state;
determine, in view of the updated inventory, that the second final provisioned state of the destination node of the new composite application is compatible with the common intermediate provisioned state by comparing the new hardware criteria and the new software criteria of the second final provisioned state with the hardware criteria and the software criteria of the common intermediate provisioned state; and responsive to a determination that the new hardware criteria and the new software criteria of the second final provisioned state is compatible with the hardware criteria and the software criteria of the common intermediate provisioned state, provision the new composite application and the future application components on the pre-provisioned resource, in accordance with the common intermediate provisioned state, and further allocating the pre-provisioned resource to the destination node having the second final provisioned state.

9. The non-transitory computer readable storage medium of claim 8, wherein the instructions further cause the processing device to:

receive an application descriptor of the new composite application in the request to provision the new composite application, the application descriptor identifying the destination node having the second final provisioned state for a particular application component of the new composite application;

determine that the resource having the common intermediate provisioned state is available;

allocate the resource to the destination node of the new composite application; and complete provisioning of the particular application component on the resource to cause the destination node to have the second final provisioned state.

10. The non-transitory computer readable storage medium of claim 9, further comprising steps:

to pre-provision a first software on the resource by installing at least one of an operating system on the resource or middleware on the resource; and to complete a provisioning of the particular application component on the resource the processing device is further to install at least one of the middleware or the particular application component on the resource.

11. The non-transitory computer readable storage medium of claim 9, wherein a first amount of time to perform the pre-provisioning of the first software on the resource to cause the resource to have the common intermediate provisioned state is at least twice a second amount of time to perform the completing of the provisioning of the application component on the resource to cause the destination node to have the second final provisioned state.

12. The non-transitory computer readable storage medium of claim 8, wherein an application descriptor of the new composite application is included in a new test descriptor that defines a new test to run on the new composite application, and wherein the plurality of previously provisioned composite applications were used to perform a plurality of previous tests.

13. The non-transitory computer readable storage medium of claim 12, wherein the instructions further cause the processing device to:

perform the new test on the new composite application; and after completing the new test, cause the resource to revert to the common intermediate provisioned state and returning the resource to a pool of available resources for later use in future composite applications.

14. The non-transitory computer readable storage medium of claim 13, wherein the resource comprises a data store having:

a first partition containing data associated with the common intermediate provisioned state; and a second partition containing additional data associated with the final provisioned state and subsequent changes to the final provisioned state; and further wherein to cause the resource to revert to the common intermediate provisioned state, the processing device is further to:

instruct a logical volume manager to revert to a snapshot in the first partition.

15. A computing device comprising:

a memory; and a processing device operatively coupled to the memory, the processing device to:

perform a statistical analysis of a plurality of previously provisioned composite applications, wherein a composite application of the plurality of previously provisioned composite applications corresponds to a plurality of nodes, wherein each of the plurality of nodes defines an application component of the composite application, wherein each of the plurality of nodes has a first final provisioned state for the application component, and wherein the first final provisioned state comprises hardware criteria and software criteria of the application component;

predict future application components of future composite applications in view of the statistical analysis, wherein each of the future composite applications corresponds to an intermediate provisioned state of a plurality of intermediate provisioned states;

identify, from the intermediate provisioned states of the future composite applications, a common intermediate provisioned state that is shared by the predicted future application components of the future composite applications, the common intermediate provisioned state indicating 1) a same type of the hardware criteria and 2) a same type of the software criteria among the intermediate provisioned states of the future application components;

responsive to identifying the common intermediate provisioned state, pre-provision a first future application component that shares the common intermediate provisioned state, wherein the pre-provisioning includes provisioning the common intermediate provisioned state on a resource to cause the resource to have the first future application component and the common intermediate provisioned state, and further wherein the resource comprises a hardware resource;

update inventory of available resources to identify that the resource is pre-provisioned with the common intermediate provisioned state;

receive a request to provision a new composite application comprising 1) a new software criteria including the first future application component and 2) a new hardware criteria including a destination node having a second final provisioned state;

determine, in view of the updated inventory, that the second final provisioned state of the destination node of the new composite application is compatible with the common intermediate provisioned state by comparing the new hardware criteria and the new software criteria of the second final provisioned state with the hardware criteria and the software criteria of the common intermediate provisioned state; and responsive to a determination that the new hardware criteria and the new software criteria of the second final provisioned state is compatible with the hardware criteria and the software criteria of the common intermediate provisioned state, provision the new composite application and the future application components on the pre-provisioned resource, in accordance with the common intermediate provisioned state, and further allocating the pre-provisioned resource to the destination node having the second final provisioned state.

16. The computing device of claim 15, wherein the processing device is further to:
    receive an application descriptor of the new composite application in the request to provision the new composite application, the application descriptor identifying the destination node having the second final provisioned state for a particular application component of the new composite application;
    determine that the resource having the common intermediate provisioned state is available;
    allocate the resource to the destination node of the new composite application; and
    complete provisioning of the particular application component on the resource to cause the destination node to have the second final provisioned state.

17. The non-transitory computer readable storage medium of claim 16, wherein an application descriptor of the new composite application is included in a new test descriptor that defines a new test to run on the new composite application, wherein the plurality of previously provisioned composite applications were used to perform a plurality of previous tests, and wherein the instructions further cause the processing device to:
    perform the new test on the new composite application; and
    after completing the new test, cause the resource to revert to the common intermediate provisioned state and returning the resource to a pool of available resources for later use in future composite applications.

* * * * *